United States Patent
Luu et al.

(12) 
(10) Patent No.: US 6,503,590 B1
(45) Date of Patent: Jan. 7, 2003

(54) METHOD AND MATERIAL FOR PACKAGING

(76) Inventors: Tom Luu, 232 Beegum Way, San Jose, CA (US) 95123; Ana Luu, 232 Beegum Way, San Jose, CA (US) 95123

(*) Notice: Subject to any disclaimer, the term of this patent is extended or adjusted under 35 U.S.C. 154(b) by 138 days.

(21) Appl. No.: 09/650,234

(22) Filed: Aug. 29, 2000

(51) Int. Cl.[7] .............................................. B65D 81/107
(52) U.S. Cl. ....................... 428/40.1; 206/521; 206/523; 206/593; 206/813; 428/41.7; 428/41.8; 428/41.9; 428/192; 428/194
(58) Field of Search ............................. 428/40.1, 41.7, 428/41.8, 41.9, 192, 194; 206/521, 523, 593, 813, 822

(56) References Cited

U.S. PATENT DOCUMENTS

| | | |
|---|---|---|
| 4,253,892 A | 3/1981 | D'Angelo |
| 4,339,039 A | 7/1982 | Mykleby |
| 4,953,705 A | 9/1990 | Evamy |
| 5,132,156 A | 7/1992 | Trassare, Jr. et al. |
| 5,268,228 A | * 12/1993 | Orr .............................. 428/343 |
| 5,628,158 A | * 5/1997 | Porter .......................... 52/309.9 |
| 6,001,471 A | * 12/1999 | Bries ............................ 428/343 |

* cited by examiner

Primary Examiner—Nasser Ahmad
(74) Attorney, Agent, or Firm—Michael I Kroll

(57) ABSTRACT

The present invention 10 discloses a packing material comprised of a Styrofoam core 14 having a polyethylene or stretch film 16 bonded by adhesive 18 to the upper and lower surface of the Styrofoam material. The coating materials improve the characteristic of Styrofoam 14 by dispersing a load force across the material. A corrugated layer 20 may be added by adhesive means 18 either as an additional layer or substituting for one or both of the film layers 16 and thereby forms a product that can be die cut which will replace the need for formed Styrofoam in many applications. The die cut material can be shipped in a substantially planar form and assembled on the job site. The edge of the Styrofoam core 14 may be coated with an additional adhesive layer 18 for attachment thereto of a peel-away protective layer 22.

1 Claim, 12 Drawing Sheets

METHOD AND MATERIAL FOR PACKAGING

BACKGROUND OF THE INVENTION

1. Field of the Invention

The present invention relates generally to packaging and, more specifically, to a method and material for packaging. The use of Styrofoam in packing is well known. It comes in the form of granular packing material or formed into inserts that are designed for specific applications. The present invention is concerned with improving the use and handling of Styrofoam packing material.

The improved packing material is achieved by adding strengthening elements to Styrofoam. The first configuration is composed of a Styrofoam core having a polyethylene or stretch film bonded to the upper and lower surface of the Styrofoam material. The coating materials improve the characteristic of Styrofoam by dispersing a load force across the material. Styrofoam is a very brittle packaging material. Any force tends to fracture the Styrofoam into a number of pieces. The present invention overcomes these shortcomings by reinforcing the upper and/or lower surface with an adhesively attached structural material enhancement material which does nor necessarily contribute to the rigidity of the product. The film applied to the exterior surface of the intended Styrofoam permits the product to be bent in curvilinear fashion.

By adding a cardboard layer by adhesive means either as an additional layer or substituting one or both of the film layer forms a product that can be die cut which will replace the need for formed Styrofoam in many applications. The die cut material can be shipped in a substantially planar form and assembled on the job site. The application of the product as shown in the accompanying drawings is for illustrative purposes and is not intended to limit the application of the product.

2. Description of the Prior Art

There are other methods and materials used in packaging. Typical of these is U.S. Pat. No. 4,953,705 issued to Evamy on Sep. 4, 1990.

Another patent was issued to Mykleby on Jul. 13, 1982 as U.S. Pat. No. 4,339,039. Yet another U.S. Patent No. 5,132,156 was issued to Trassare, Jr., et al. on Jul. 21, 1992 and still yet another was issued on Mar. 3, 1981 to D'Angelo et al. as U.S. Pat. No. 4,253,892.

U.S. Pat. No. 4,953,705

Inventor: David L. Evamy

Issued: Sep. 4, 1990

There is described a package comprising a container and a lining, the package including at least one slot to receive a tab. The slot is bounded on one side by the container and on the other side by the cushioning material, which is formed with an abutment surface facing away from the entrance to the slot, and the tab includes a detent capable of engaging the abutment surface to resist withdrawal of the tab from the slot. Preferably the container is formed from folded sheet material, the lining being either a separately formed body or a plurality of tablets of cushioning material bonded to the interior surfaces of the container. The detent may be a strip of sheet material hingedly connected to the tab, or may be formed from within the tab itself.

U.S. Pat. No. 4,339,039

Inventor: Laurie G. Mykleby

Issued: Jul. 13, 1982

A cushion for packaging an article in a container comprising flexible foam material and a pliable non-porous cover contiguously surrounding the foam material. The cover may include a lip which may be secured to the container. A plurality of air vents in the cover adjacent the lip control the flow of air out of the cover when the foam is compressed. By controlling the air flow out of the foam material, the dynamic resistance of the cushion may be increased, so that more force is absorbed by the cushion when an external force is applied to the container than would be absorbed if exposed foam material were used. A plurality of cushions may be secured to the inside of the container to hold the article snugly in place.

U.S. Pat. No. 5,132,156

Inventor: Anthony Trassare, Jr. et al.

Issued: Jul. 21, 1992

A void filler (14, 16) especially suited for filling large volumes is made from first and second panels (18, 20), each panel having a core (26) sandwiched between face sheets (22, 24). The core is typically a corrugated honeycomb core so that the panel is stiff, strong and yet lightweight. The panels each have generally horizontal upper and lower edges (30, 32) and generally vertical first and second (34, 36) edges. The panels are connected at a hinge (44) along their upper edges. A limiter (50), attached at or near the lower edges, limits the movement of the lower edges away from one another so the panels can move from a flat, storage condition to a use condition, exhibiting a generally inverted V-shape. Two void fillers can be hingedly connected to form an M-shaped void filler assembly (2). The void fillers are typically used between a container bulkhead (10) and a load (8); the upper and lower edges of the void filler are aligned between the load and the bulkhead so the forces on the void filler are exerted on the generally vertical edges during transit.

U.S. Pat. No. 4,253,892

Inventor: Joseph J. D'Angelo

Issued: Mar. 3, 1981

Method and apparatus are described for making cushioned shipping packet bags. A pocket within the cushioned bag is defined between two resilient, lightweight, flexible cushioning layers of polypropylene microfoam material which advantageously exhibits a relatively "non-slip" frictional gripping action on the item or items contained within the sealed packet bag. The cushioned bag is produced on a continuous motion machine having capability for adjusting the length and width of the cushioned bags produced. Two packages can be simultaneously produced end-to-end when their combined lengths do not exceed the overall width of the machine. To enable the protective outer Kraft paper layers of the bag to be sealed together in spite of the intervening polypropylene material, this material is burned away from between the outer layers during the heat sealing of a polyethylene coating on the inner surfaces of the Kraft paper enclosure by heat energy conducted through the Kraft paper.

While these methods and materials used in packaging may be suitable for the purposes for which they were designed, they would not be as suitable for the purposes of the present invention, as hereinafter described.

SUMMARY OF THE PRESENT INVENTION

The present invention discloses a packing material comprised of a Styrofoam core having a polyethylene or stretch film bonded by adhesive to the upper and lower surface of the Styrofoam material. The coating materials improve the characteristic of Styrofoam by dispersing a load force across the material. A corrugated layer may be added by adhesive means either as an additional layer or substituting for one or both of the film layers and thereby forms a product that can be die cut which will replace the need for formed Styrofoam in many applications. The die cut material can be shipped in a substantially planar form and assembled on the job site. The edge of the Styrofoam core may be coated with an additional adhesive layer for attachment thereto of a peel-away protective layer.

A primary object of the present invention is to provide a packaging material that will overcome the shortcomings of Styrofoam.

Another object of the present invention is to provide a packaging material having a Styrofoam core having an upper an lower surface comprised of a polyethylene-like film.

Yet another object of the present invention is to provide a packaging material having a Styrofoam core having an upper and lower surface comprised of a corrugated cardboard.

Still yet another object of the present invention is to provide a packaging material having a Styrofoam core having an upper and lower surface comprised of a combination of polyethylene film and/or corrugated cardboard.

Another object of the present invention is to provide a packaging material that can be die-cut to form a holder insert for the support of a packaged item.

Yet another object of the present invention is to provide a packaging material that can be die-cut to a plurality of specifications and assembled at a remote site to form a holder insert for the support of a packaged item.

Still yet another object of the present invention is to provide a packaging material that forms an integral part of a shipping container.

Another object of the present invention is to provide a shipping container having a packaging material fixed to at least one side whereby a shipping item can be enfolded therein and supported thereby.

Additional objects of the present invention will appear as the description proceeds.

The present invention overcomes the shortcomings of the prior art by providing a method and material for packaging. The material is composed of a Styrofoam core having a polyethylene or stretch film bonded to the upper and lower surface of the Styrofoam core. The coating materials improve the characteristic of Styrofoam by dispersing a load force across the material. The film applied to the exterior surface of the intended Styrofoam permits the product to be bent in curvilinear fashion.

By adding a cardboard layer by adhesive means either as an additional layer or substituting one or both of the film layers forms a product that can be die cut which will replace the need for formed Styrofoam in many applications. The die cut material can be shipped in a substantially planar form and assembled on the job site. The application of the product as shown in the accompanying drawings is for illustrative purposes and is not intended to limit the application of the product.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
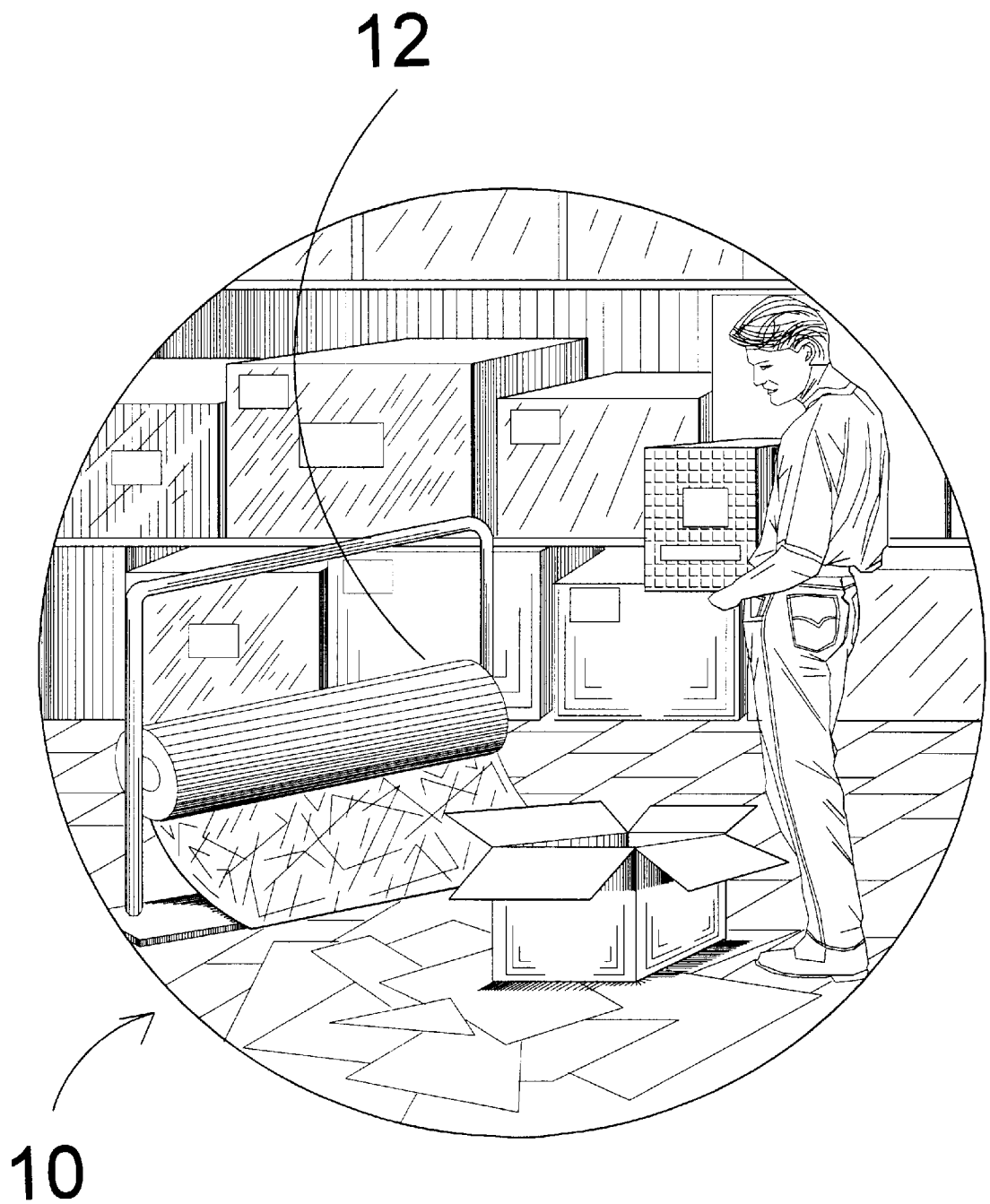
FIG. 1 is an illustrative view of the present invention in use. Shown is a roll of packing material having a central core of Styrofoam therein.

With regard to reference numerals used, the following numbering is used throughout the drawings.

10 present invention
12 roll
14 Styrofoam
16 polyethylene sheet
18 bonding material
20 corrugated material
22 protective element
24 closed container
26 individual container
28 item
30 tape
32 side of container
34 length of material

DESCRIPTION OF THE PREFERRED EMBODIMENT(S)

In order that the invention may be more fully understood, it will now be described, by way of example, with reference to the accompanying drawings in which FIGS. 1 through 12 illustrate the present invention being a method and material for packaging.

Turning to FIG. 1, shown therein is an illustrative view of the present invention 10 in use. Shown is a roll 12 of packing material having a central core of Styrofoam therein. Styrofoam is a trademark for expanded cellular polystyrene..

Figure 2:
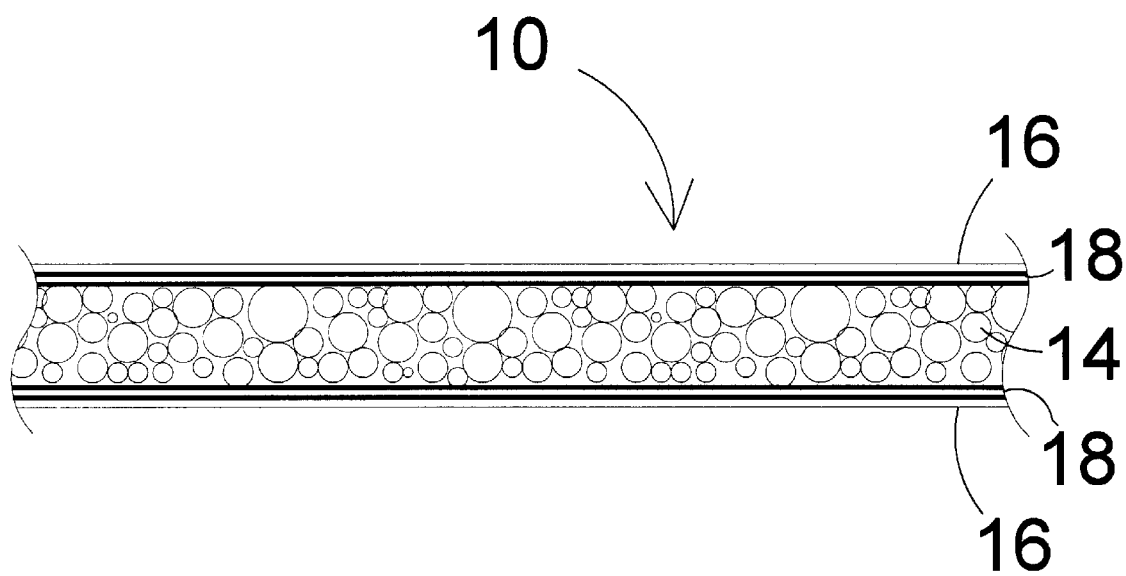
FIG. 2 is a sectional view of the present invention. Shown is a packing material having a Styrofoam core having a polyethylene sheet adhesively bonded thereto.

Turning to FIG. 2, shown therein is a sectional view of the present invention 10. Shown is a packing material having a Styrofoam core 14 having a polyethylene sheet 16 adhesively bonded 18 thereto on the top side and the bottom side of the Styrofoam core.

Figure 3:
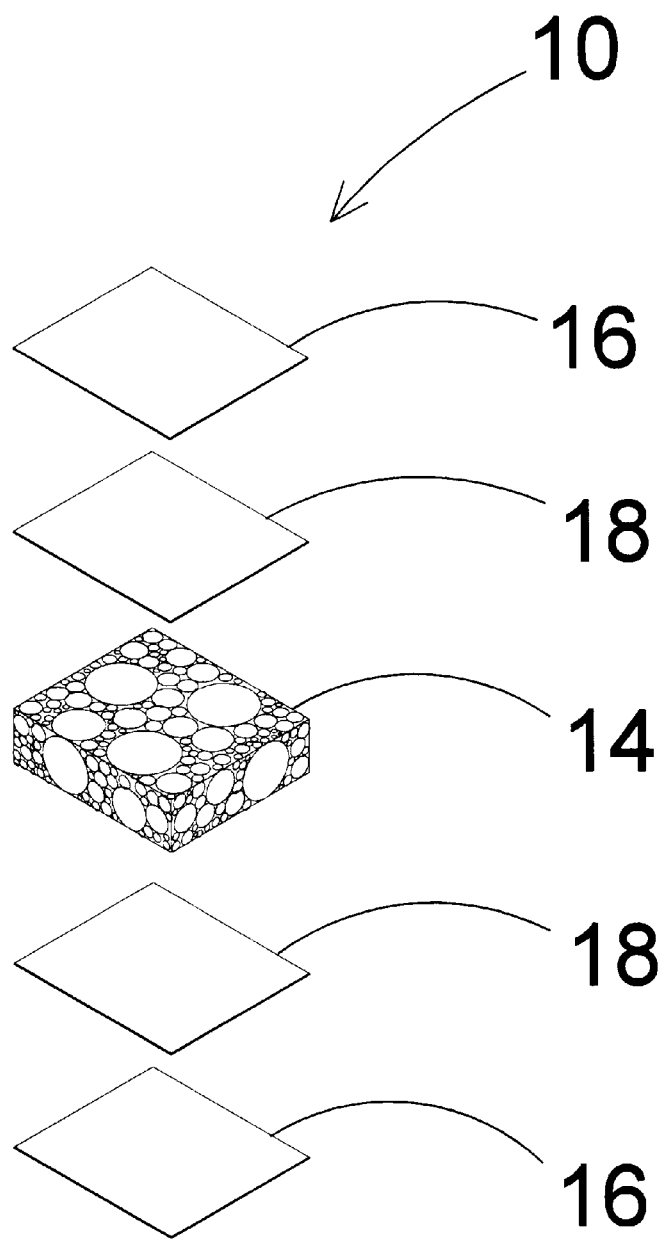
FIG. 3 is an exploded view of the present invention showing a Styrofoam core having an upper and lower surface having a bonding agent affixed thereto whereby a layer of polyethylene film can be attached to the upper and/or lower Styrofoam core.

Turning to FIG. 3, shown therein is an exploded view of the present invention 10 showing a Styrofoam core 14 having an upper and lower surface having a bonding agent 18 affixed thereto whereby a layer of polyethylene film 16 can be attached to the upper and/or lower Styrofoam core 14.

Figure 4:
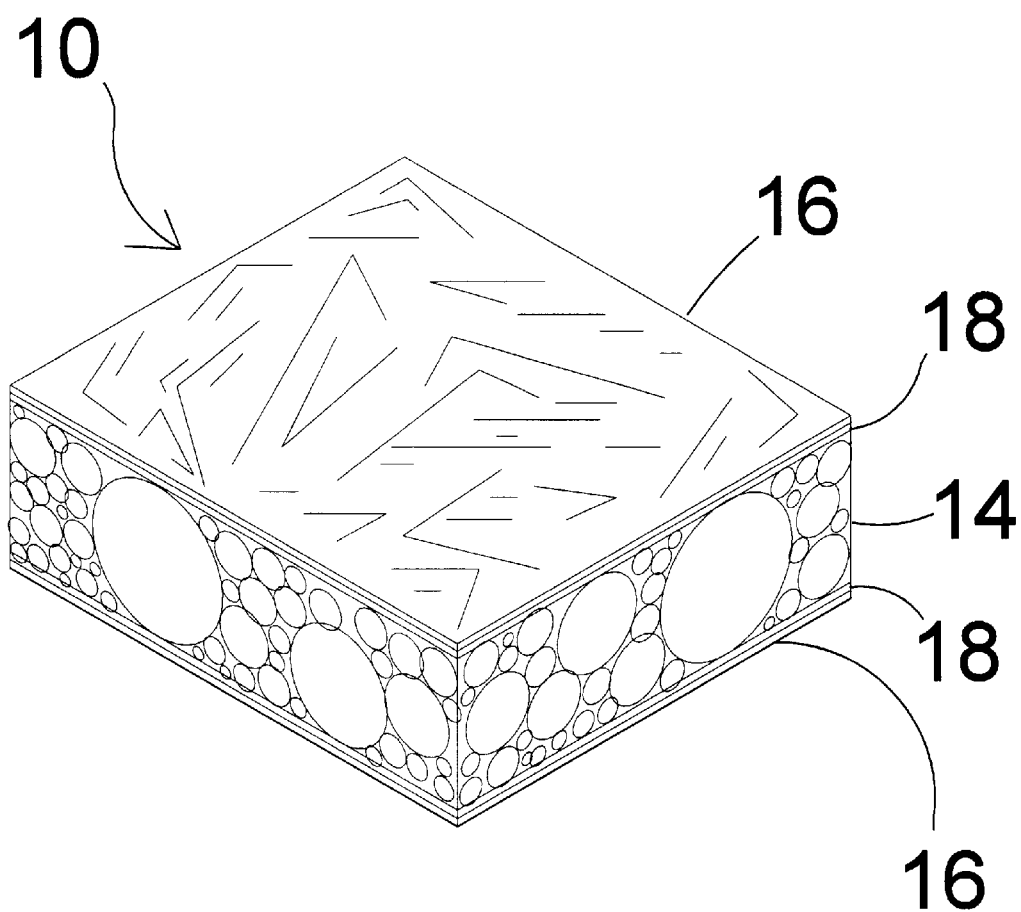
FIG. 4 is a perspective view of the present invention showing a packaging material comprised of a Styrofoam core having a pliable plastic film fixed to the upper and lower surface. The pliable layers will provide means for bending the Styrofoam in a curvilinear fashion.

Turning to FIG. 4, shown therein is a perspective view of the present invention 10 showing a packaging material comprised of a Styrofoam core 14 having a pliable plastic film 16 fixed to the upper and lower surface by bonding material 18. The pliable layers 16 will provide means for bending the Styrofoam in a curvilinear fashion.

Figure 5:
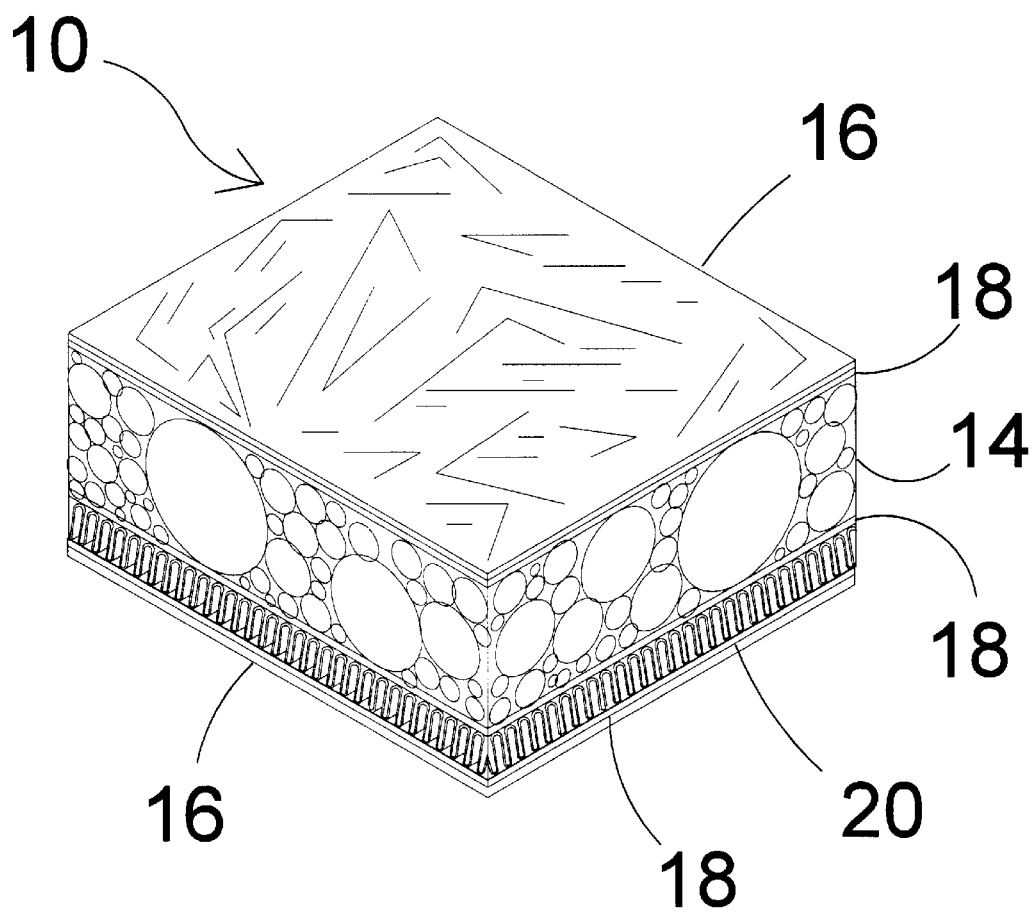
FIG. 5 is a perspective view of the present invention showing a packaging material comprised of a Styrofoam core having a pliable plastic film fixed to the upper and lower surface and a corrugated reinforcement encased between the Styrofoam core and the polyethylene film. This configuration permits the material to be die cut to form a support member for a shipped item.

Turning to FIG. 5, shown therein is a perspective view of the present invention showing a packaging material comprised of a Styrofoam core 14 having a pliable plastic film 16 fixed to the upper and lower surface and a corrugated reinforcement 20 encased between the Styrofoam core 14 and the polyethylene film 16. This configuration permits the material to be die cut to form a support member for a shipped item. Bonding material 18 is shown between the layers for securing the layers to each other.

Figure 6:
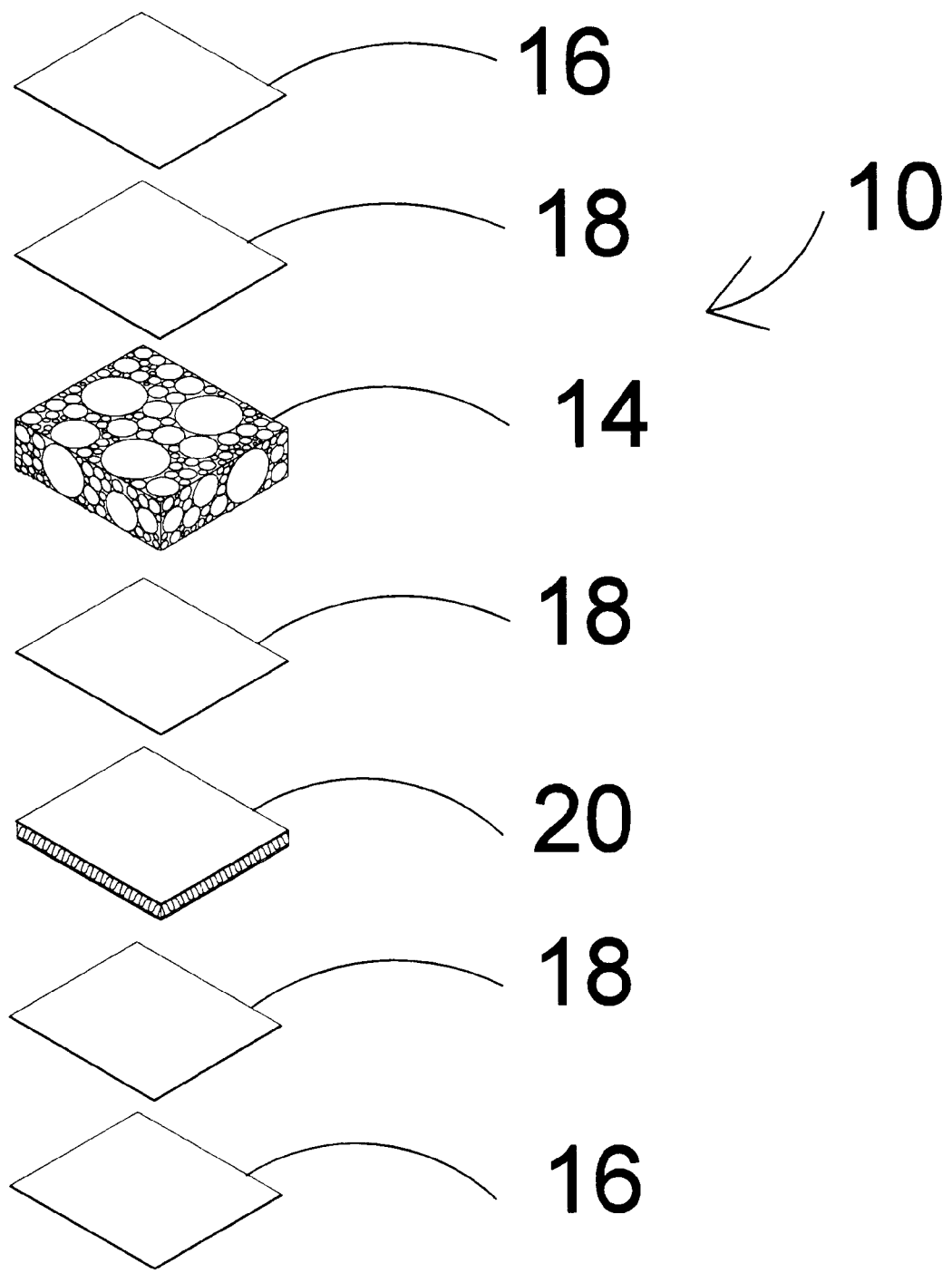
FIG. 6 is an exploded view of the present invention showing a Styrofoam core having an upper and lower surface having a bonding agent affixed thereto. The upper surface has a polyethylene film fixed to the Styrofoam core while the bottom surface has a corrugated element fixed to the bottom side. The corrugated layer has a bonding agent affixed to the exterior surface whereby a polyethylene film can be attached thereto.

Turning to FIG. 6, shown therein is an exploded view of the present invention 10 showing a Styrofoam core 14 having an upper and lower surface having a bonding agent 18 affixed thereto. The upper surface has a polyethylene film 16 fixed to the Styrofoam core 14 while the bottom surface has a corrugated element 20 fixed to the bottom side. The top side of corrugated layer 20 attaches to the bonding agent 18 affixed to the bottom side of core 14. The bottom surface of layer 20 has adhesive 18 thereon whereby a polyethylene film 16 can be attached thereto.

Figure 7:
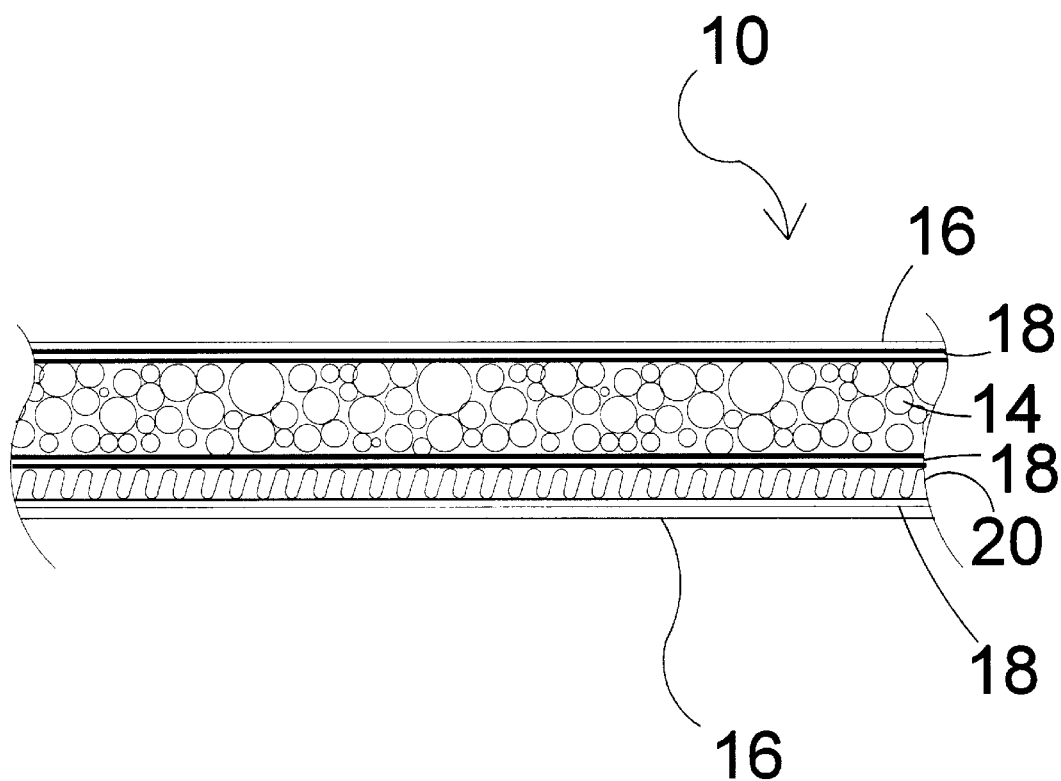
FIG. 7 is a perspective view of the present invention showing a Styrofoam core having an upper and lower surface having a bonding agent affixed thereto. The upper surface has a polyethylene film fixed to the Styrofoam core while the bottom surface has a corrugated element fixed to the bottom side. The corrugated layer has a bonding agent affixed to the exterior surface whereby a polyethylene film can be attached thereto.
Figure 8:
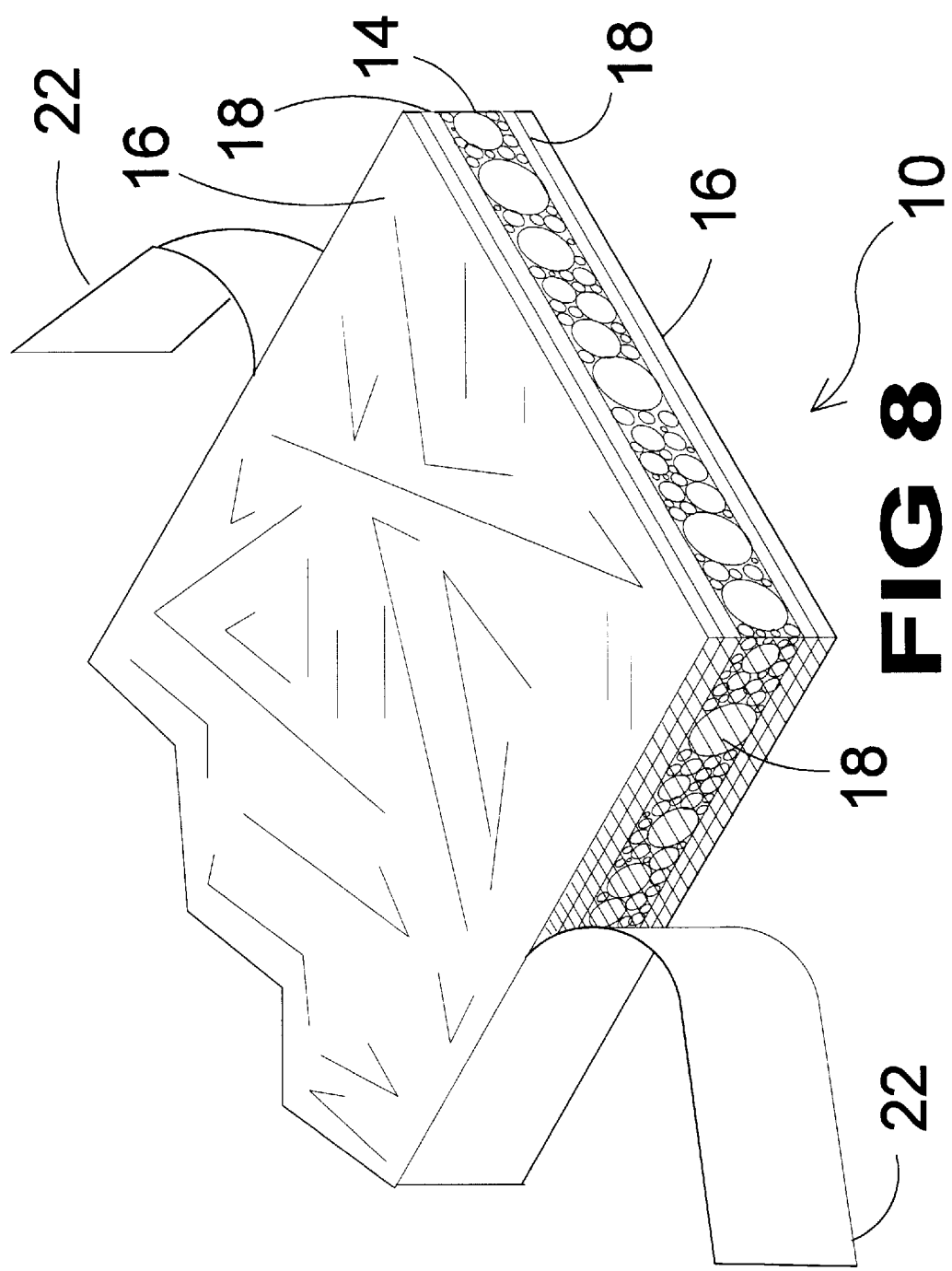
FIG. 8 is a perspective view of the present invention showing an additional element in the form of a Styrofoam core having a pliable plastic film fixed to the upper and lower surface. Also shown is an adhesive layer fixed to the edge wall of the packaging material having a peelably removable covering.

Turning to FIG. 7, shown therein is a perspective view of the present invention 10 showing a Styrofoam core 14 having an upper and lower surface having a bonding agent 18 affixed thereto. The upper surface has a polyethylene film 16 fixed to the Styrofoam core 14 while the bottom surface has a corrugated element 20 fixed to the bottom side. The corrugated layer 20 has a bonding agent 18 affixed to the exterior surface whereby a polyethylene film 16 can be attached thereto. Turning to FIG. 8, shown therein is a perspective view of the present invention 10 showing an additional element in the form of a Styrofoam core 14 having a pliable plastic film 16 fixed to the upper and lower surface by glue 18. Also shown is an additional adhesive layer 18 fixed to the edge wall of the packaging material having a peelably removable protective covering 22.

Figure 9:
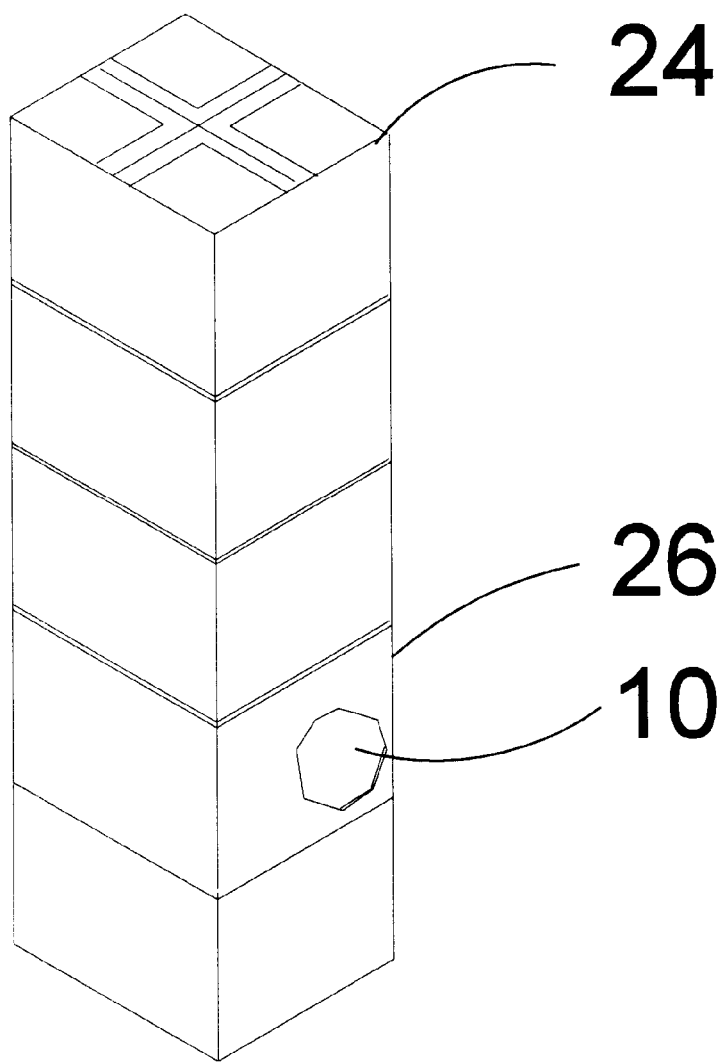
FIG. 9 is a perspective view of a plurality of closed shipping containers having shipping material of the present invention forming an integral part of said shipping container.

Turning to FIG. 9, shown therein is a perspective view of a plurality of closed shipping containers 24 having shipping material of the present invention 10 forming an integral part of an individual shipping container 26.

Figure 10:
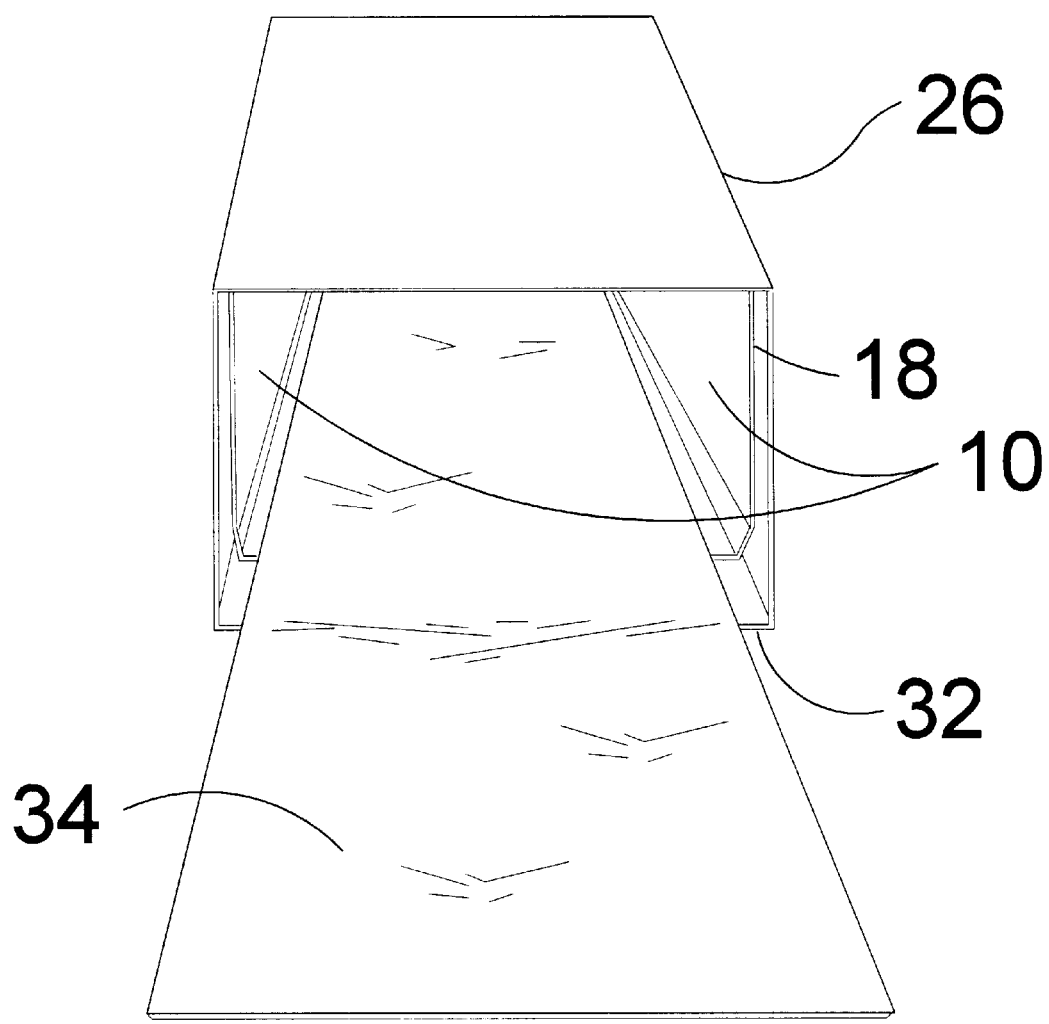
FIG. 10 is a perspective view of the present invention showing a shipping container having the Styrofoam core material of the present invention fixed to the interior of the shipping container. One side of the shipping container has a length of packaging material sufficient to enclose an item for shipping. The length of shipping material will keep the wrapped item suspended from contact of all sides of the shipping container with the exception of the side having the packaging material affixed thereto.

Turning to FIG. 10, shown therein is a perspective view of the present invention showing a shipping container 26 having the Styrofoam core material of the present invention 10 fixed by adhesive 18 to the interior of the shipping container. One side 32 of the shipping container 26 has a length of packaging material 34 sufficient to enclose an item for shipping. The length of shipping material 34 will keep the wrapped item suspended from contact of all sides of the shipping container 26 with the exception of the side not having the packaging material affixed thereto.

Figure 11:
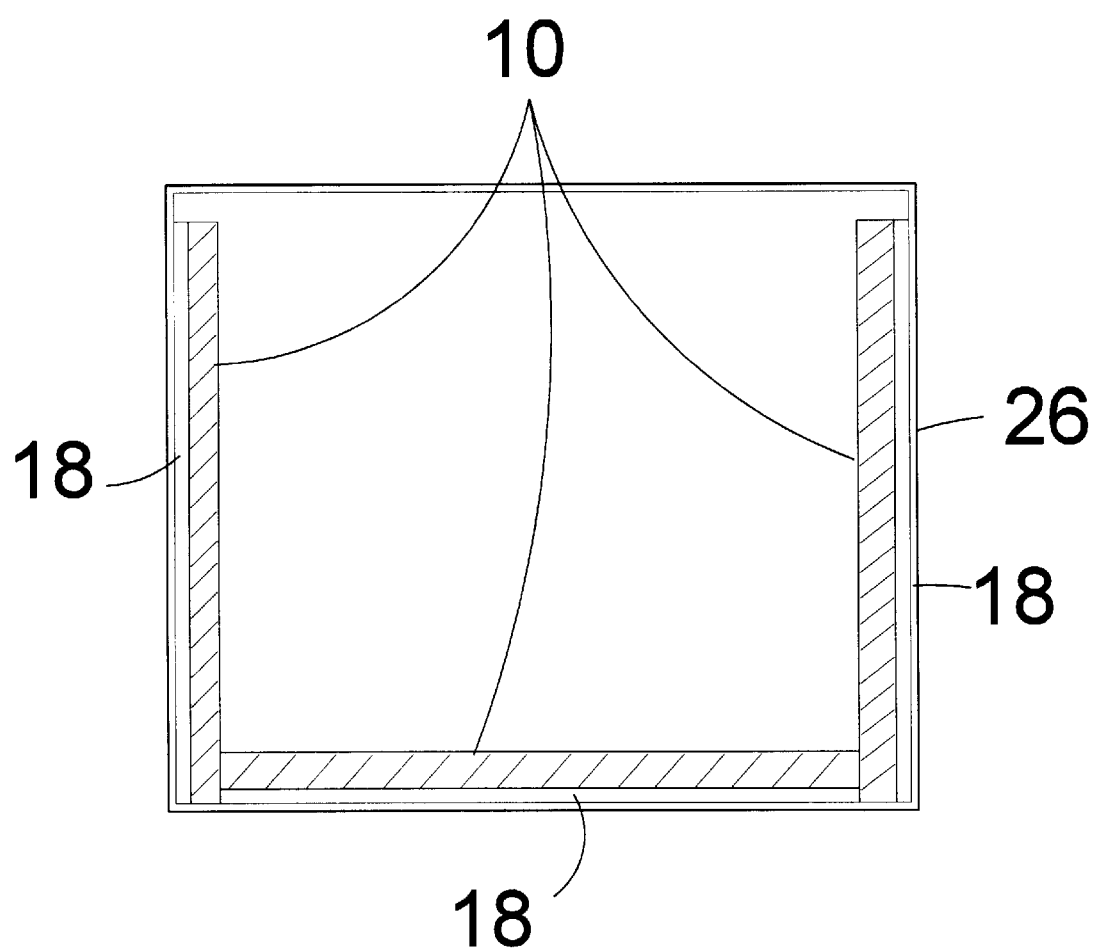
FIG. 11 is a sectional view of the shipping container of the present invention. Shown is a shipping container having the packaging material of the present invention fixed to three of the interior faces of the shipping container. The oppositely opposed packaging material sides will protect the distal ends of the item being shipped.

Turning to FIG. 11, shown therein is a sectional view of the shipping container 26 of the present invention. Shown is a shipping container 26 having the packaging material of the present invention 10 fixed by adhesive 18 to three of the interior faces of the shipping container. The oppositely opposed packaging material sides will protect the distal ends of the item being shipped.

Figure 12:
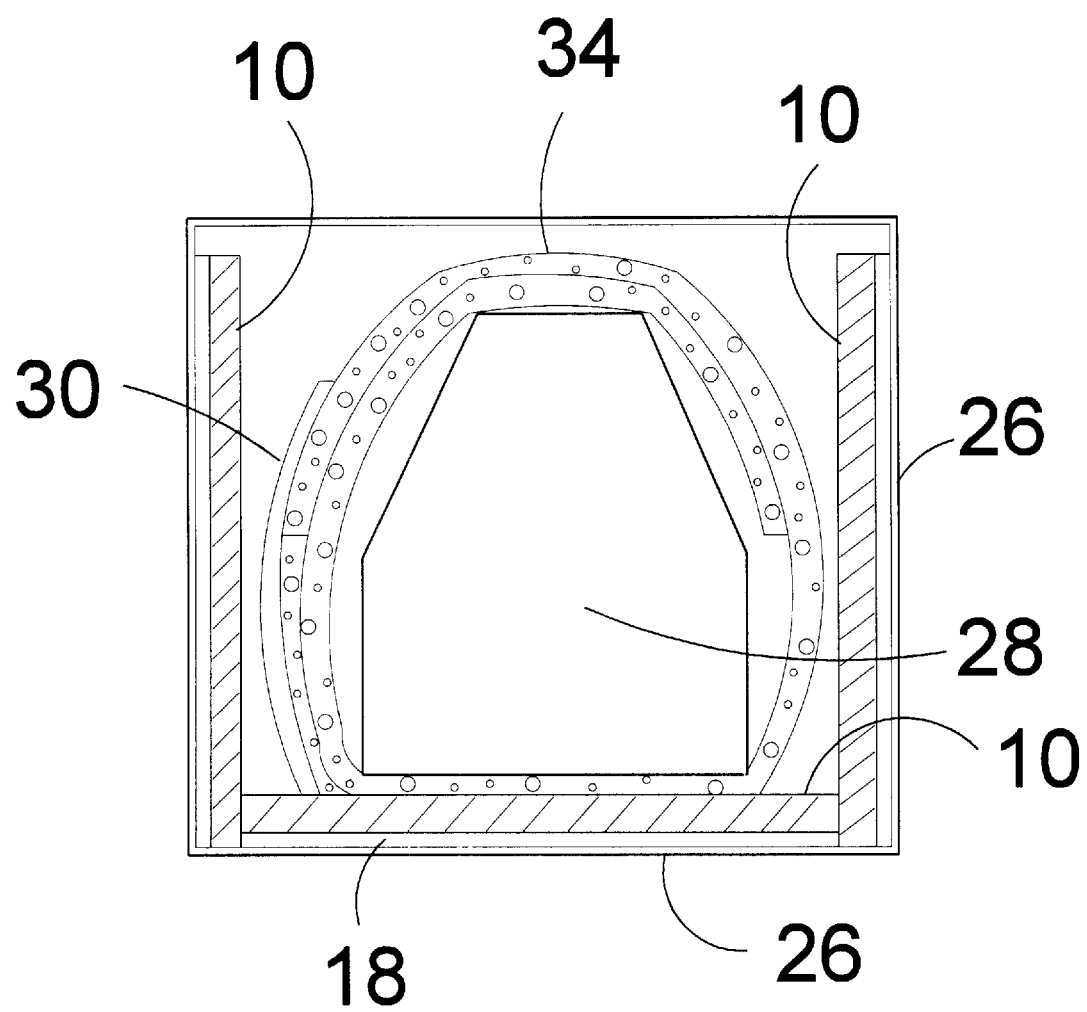
FIG. 12 is a sectional view of the shipping container of the present invention. Shown is a shipping container having the packaging material of the present invention fixed to three of the interior faces of the shipping container. The oppositely opposed packaging material sides will protect the distal ends of the item being shipped. The shipped item is encompassed by the remaining side being keep in suspension while being shipped.

Turning to FIG. 12, shown therein is a sectional view of the shipping container 26 of the present invention. Shown is a shipping container 26 having the packaging material of the present invention 10 fixed by adhesive 18 to three of the interior faces of the shipping container. The oppositely opposed packaging material sides will protect the distal ends of the item 28 being shipped. The shipped item is encompassed by a length of material 34 thereby being kept in suspension while being shipped. Tape 30 is used to secure the ends of the length of material 34 together.

We claim:

1. A packing material useful for packaging an article inside a container, comprising:

a) a core layer of expanded cellular polystyrene, said core layer having a top side and a bottom side;

b) a first adhesive layer disposed on said top side of said core layer;

c) a second adhesive layer disposed on said bottom side of said core layer;

d) a corrugated layer, said corrugated layer having a top side and a bottom side;

e) said corrugated layer disposed on said second adhesive layer on said bottom side of said core layer;

f) a third adhesive layer disposed on said bottom side of said corrugated layer; and, g) a second flexible sheet disposed on said third adhesive layer on said bottom side of said corrugated layer.

\* \* \* \* \*